Figure 1:
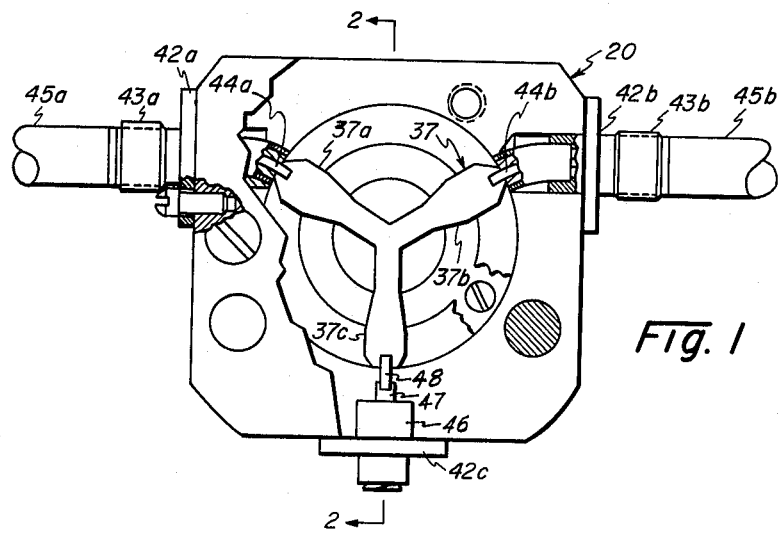

April 12, 1966  D. L. STELZER  3,246,261
ISOLATOR USING INTERNALLY TERMINATED CIRCULATOR
Filed Jan. 24, 1963

INVENTOR.
DONALD L. STELZER

Richard J. Seeger
ATTORNEY

United States Patent Office 3,246,261
Patented Apr. 12, 1966

3,246,261
ISOLATOR USING INTERNALLY TERMINATED CIRCULATOR
Donald L. Stelzer, Rockville, Md., assignor to The Bendix Corporation, Southfield, Mich., a corporation of Delaware
Filed Jan. 24, 1963, Ser. No. 253,639
2 Claims. (Cl. 333—1.1)

This invention pertains to an anisotropic ferromagnetic isolator of exceptionally small size which has good isolation characteristics with minimum variation due to temperature change.

Microwave isolators using anisotropic ferromagnetic materials to permit signal passage in only one direction are well known to the art. An anisotropic ferromagnetic material, when subjected to the influence of a magnetic field, permits energy passage in one direction but not another. However, anisotropic ferromagnetic isolators of the prior art, due to their basic design, require relatively large amounts of the anisotropic ferromagnetic material to achieve a given isolation. This not only makes the isolator bulky and unwieldy, but also, since anisotropic ferromagnetic materials are temperature sensitive, the isolator characteristics are highly sensitive to temperature variations.

This invention, by means of a unique design, reduces the volume of anisotropic ferromagnetic material necessary to achieve a given isolation level by utilizing a basic stripline Y-circulator structure with a resistor to absorb the signal going in the reverse direction. This reduces the overall size of the isolator, improves the isolation characteristics, and makes the device less temperature sensitive. This is accomplished by a Y-shaped stripline conductor having at its center portion an anisotropic ferromagnetic material which is subject to a magnetic field. Coaxial cables are attached to two of the arms of the Y-conductor while the other arm of the Y is terminated in a resistor having the characteristic impedance of the cables which are attached to each of the other two arms. In this manner, signals which travel in one direction through the cable are directed towards and absorbed by the resistor while signals going in the other direction of the cable bypass the resistor and are not affected thereby.

It is therefore an object of this invention to provide a miniature anisotropic ferromagnetic isolator having a minimum temperature variation. In particular, the insertion phase tracking or variance as a function of temperature between units is very small being ±2 degrees maximum from 0° to 65° C.

It is a further object of this invention to reduce the anisotropic ferromagnetic material necessary by utilizing a Y-circulator structure and a resistor to absorb a signal traveling in the opposite direction. This is accomplished by using a Y-shaped stripline conductor which is subject at its central portion to the effects of an anisotropic ferromagnetic material having a magnetic field passing therethrough. One arm of the Y conductor is connected to the resistor which is the characteristic impedance of a cable attached to each of the other two arms so that a signal going in one direction will be absorbed by the resistor and a signal going in the other direction will bypass the resistor.

Figure 2:
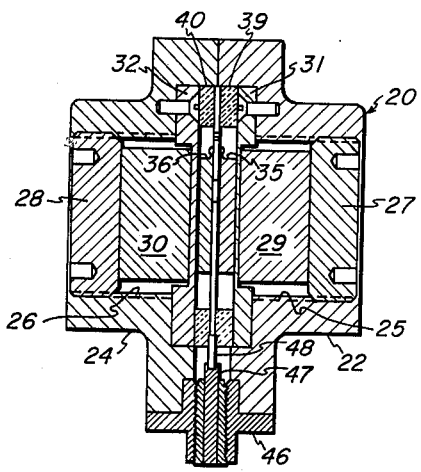
Figure 3:
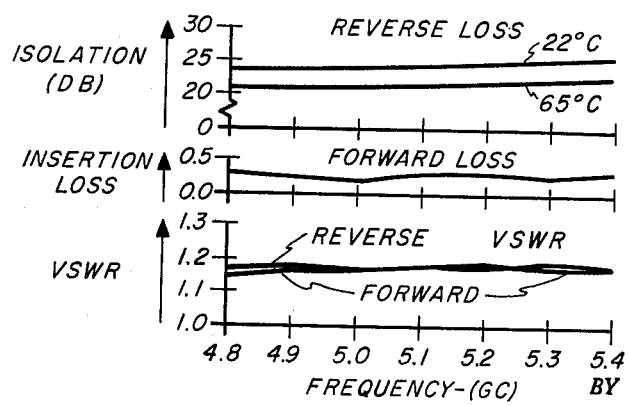

These and other objects and advantages will become more apparent when a preferred embodiment is considered in connection with the drawing in which:

FIGURE 1 is a partially sectioned plan view of a preferred embodiment of this invention.
FIGURE 2 is a section taken at 2—2 of FIGURE 1.
FIGURE 3 is a graph showing the properties of the preferred embodiment of this invention.

In the drawings a housing 20 has two sections 22, 24 which are bolted together. Portions 22 and 24 are threaded internally at 25 and 26 respectively. The retaining plugs 27, 28 are externally threaded and engage the internal threads 25 and 26 respectively and are rotated into threads 25 and 26 until they abut against magnets 29, 30 which are fully charged Indox-1 ceramic magnets. Portions 22, 24 and plugs 27, 28 are of carbon steel, and provide magnetic paths for magnets 29, 30.

Aluminum discs 31, 32 are bolted to housing portions 22, 24 respectively and hold magnets 29, 30 securely against their respective plugs 27, 28. Placed centrally of magnets 29, 30 and located therebetween are garnet discs 35, 36 of anisotropic material. Located between discs 35, 36 is a Y-shaped stripped conductor 37 having arms 37a, 37b and 37c emanating from the center thereof. The arms of conductor 37 are spaced from discs 31, 32 by insulating spacers 39, 40 which are of a plastic composition.

Housing 20 has three ports 42a, 42b and 42c. Ports 42a and 42b are fitted with coaxial connectors 43a and 43b each of which has a central conductor 44a and 44b which are attached respectively to arms 37a and 37b of Y-strip conductor 37. A coaxial cable 45a is connected to connector 43a and a coaxial cable 45b is connected to coaxial connector 43b forming a low loss connection therewith. Suitable coaxial connectors 43a and 43b are commercially available.

The third arm or port 42c has a brass load adapter 46 fitted therein and connected centrally in the adapter 46 is a resistor support 47 which holds forth at its inner end a fifty ohm load resistor 48 which is in electrical contact with the end of arm 37c. The ohmage of resistor 48 is chosen to equal that of the characteristic impedance of cables 45a and 45b.

The garnet discs 35, 36, as mentioned, are of an anisotropic material which have the ability to concentrate an applied magnetic field from magnets 29, 30 in such a manner that a signal entering one arm, for example arm 37a, of strip conductor 37 will be directed almost entirely to arm 37b with little or no signal going to arm 37c. This is the forward signal which passes from cable 45a to cable 45b with little or no attenuation. However, a signal going in the reverse direction in cables 45a and 45b will enter arm 37b and be directed almost entirely to arm 37c with little or no signal going to arm 37a in the reverse direction. Since arm 37c is terminated in the characteristic impedance of cable 45b, the signal will be almost entirely absorbed with little or no reflection therefrom which thereby minimizes the reverse direction signal and provides good isolation. In this manner, the resistor 48, which is temperature independent and which is of relatively small size, plays a significant part in preventing reverse signals thereby lessening the need for larger anisotropic ferromagnetic materials. Since anisotropic ferromagnetic materials are temperature sensitive, by reducing the mass of the material, the temperature sensitivity is decreased. Further, the bulk of the isolator is also decreased.

More specifically, discs 35, 36 are polycrystalline yttrium iron garnet and may be obtained from Trans-Tech, Inc., Gaithersburg, Marylind. For equivalent isolation, the length of the garnet material in this embodiment is less than that of conventional isolators by the ratio 3:1.

Operation

Briefly then, the operation of this embodiment is as follows. A forward signal in cable 45a and 45b enters the arm 37a and is caused by the anisotropic effects of the material 35, 36 to go almost entirely to arm 37b with little or no signal going to arm 37c. In the reverse direction, with the signal entering from cable 45b to arm 37b, the signal is passed almost entirely to arm 37c which is terminated in the characteristic impedance of cable 45b so that there are no reflections and hence the signal is entirely absorbed. This then provides an isolator since the signal can pass in the forward direction from cable 45a to 45b but in the reverse direction, going from 45b to 45a the signal is almost entirely absorbed.

By turning the isolator over and connecting connector 43b to cable 45a and connecting connector 43a to cable 45b, the direction of isolation is reversed.

In FIGURE 3a the reverse loss or loss from a signal in a reverse direction going from cable 45b to 45a is shown for two temperatures with the difference being relatively small.

In FIGURE 3b the insertion loss in the forward direction going from cable 45a to 45b is shown and is fairly constant and rather small.

In FIGURE 3c the voltage standing wave ratio is plotted for both the reverse and forward directions and it is seen to be close to unity in both directions and fairly constant for both directions.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. A microwave isolator for providing signal passage in one direction only in a coaxial line comprising
   a Y-shaped strip conductor,
   anisotropic ferromagnetic means being located centrally of said Y conductor,
   magnetic field means for directing a field through said anisotropic ferromagnetic means,
   a dissipating resistance material for terminating one arm of said Y conductor in the characteristic impedance of said coaxial line,
   the other two arms of said Y conductor being connected to said coaxial line,
   said resistance material dissipating the signals entering said one arm to therby provide a two port isolator,
   said one arm having notch means at its end to receive said resistance material,
   said resistance material being connected to the notch means of said one arm,
   a housing to enclose said Y strip conductor, anisotropic ferromagnetic means, and magnetic field means,
   resistance material support means being incorporated in said housing and supporting the other end of said resistance material.

2. A microwave isolator for providing signal passage in one direction only in a coaxial line comprising
   a Y-shaped strip conductor having three arms extending radially from a common center,
   anisotropic ferromagnetic means being located centrally of said Y conductor,
   magnetic field means for directing a field through said anisotropic ferromagnetic means,
   a housing for supporting said Y-shaped strip conductor and said magnetic field means,
   two terminal ports being supported by said housing and being connected to the coaxial line,
   two arms of said Y-shaped strip conductor being terminated at said terminal ports thereby connecting said coaxial line to said two arms at said terminal ports,
   a dissipative member for terminating the third arm of said Y-shaped strip conductor in the characteristic impedance of the coaxial line,
   said dissipative member dissipating the signals entering said third arm thereby providing a two port isolator,
   said dissipative member being connected directly to said third arm so that it is integral with said third arm and is in direct contact with said third arm at portions of said third arm that are at the full width of said third arm and are located no further from the center of said Y conductor than said terminal ports are located from the center of said Y conductor therby resulting in a compact circulator having superior electrical characteristics.

References Cited by the Examiner

UNITED STATES PATENTS 3,085,212   4/1963   Clark _____ 333—1.1
3,089,101   5/1963   Chait et al. _____ 333—1.1

OTHER REFERENCES

Bland: "Ferrit Y Circulator," IBM Technical Disclosure Bulletin, vol. 4, No. 10, March 1962, pages 45 and 46.

HERMAN KARL SAALBACH, *Primary Examiner.*

ELI LIEBERMAN, *Examiner.*

M. NUSSBAUM, G. TABAK, W. K. TAYLOR,
*Assistant Examiners.*